Oct. 9, 1973  G. ANDERSSON  3,764,305
METHOD OF STORAGE AND HEAT RETAINING FOR
TREATED NODULAR CAST IRON
Original Filed Feb. 5, 1968
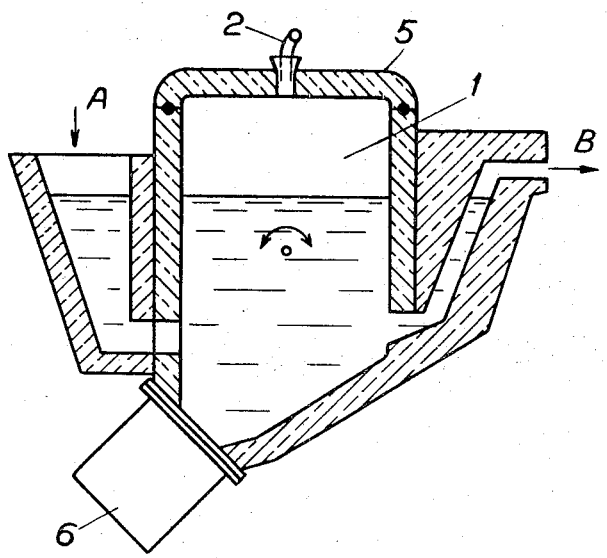
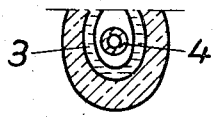
INVENTOR
GEORG ANDERSSON
BY
Jennings Bailey Jr United States Patent Office 3,764,305
Patented Oct. 9, 1973

3,764,305
METHOD OF STORAGE AND HEAT-RETAINING FOR TREATED NODULAR CAST IRON
Georg Andersson, Vasteras, Sweden, assignor to Allmanna Svenska Elektriska Aktiebolaget, Vasteras, Sweden
Continuation of abandoned application Ser. No. 703,175, Feb. 5, 1968. This application Feb. 25, 1971, Ser. No. 118,957
Claims priority, application Sweden, Feb. 10, 1967, 1,860/67
Int. Cl. C22c 37/00
U.S. Cl. 75—130 R     2 Claims

ABSTRACT OF THE DISCLOSURE

Nodular cast iron treated with an alloying medium containing magnesium is poured into an inlet of a double-crossed induction furnace, the inlet and outlet channels of which are sealed by the melt, forming a closed space above the melt from which air is evacuated and into which protective gas is introduced at a pressure above atmospheric. The nodular cast iron is stored and kept hot in the furnace and is tapped off through the outlet. The overpressure above the melt is preferably maintained at 0.005 to 0.3 atomsphere. Calcium carbide may be added from time to time to form slag.

RELATED APPLICATIONS

This application is a continuation of application Ser. No. 703,175, filed Feb. 5, 1968, and now abandoned.

The present invention relates to a method of storage, heat-retaining and possibly heating treated nodular cast iron.

In the manufacture of nodular cast iron, a basic iron is used which is for example melted in a cupola or induction furnace and treated with an alloying medium containing magnesium, for example nickel-magnesium. A material manufactured in this way cannot be stored in air for longer than about 15 minutes since the magnesium evaporates from the iron.

Neither is it possible to store nodular cast iron melt under vacuum since, due to the high vapour-pressure in the magnesium container, the magnesium in the melt is rapidly vaporised and disappears during evacuation. This is replaced by new magnesium from the melt so that this successively vanishes from the melt and the nodular cast iron is destroyed.

SUMMARY OF THE INVENTION

The invention relates to a method by which these disadvantages are avoided. The method is characterised in that molten nodular cast iron, treated with an alloying medium containing magnesium, is poured into the inlet of a double-sided closed induction furnace, preferably a channel-type induction furnace, the inlet and outlet channels of which have been closed or are sealed by means of the melt so that a closed space is formed above the melt into which space protective gas is introduced and from which air is completely or partially evacuated so that the nodular cast iron can be stored in the furnace for a considerable time and tapped off through the outlet as required. This method substantially prevents oxidisation of the magnesium and there is no great evaporation of magnesium from the melt, apart from the small quantity which is vaporised in the space above the melt. No part of the melt which is not renewed during the virtually continuous filling and tapping is isolated due to the stirring of the melt through channels in the inductor units and through the filling. Only negligible parts of the melt are subjected to air and the melt can also be protected at the inlet and outlet by protective gas so that storage in the furnace for several hours is possible without the nodular cast iron being damaged. This may be of considerable importance in, for instance, continuous manufacturing processes, assembly line production, etc. where the melt must be kept hot for sometime. The furnace may also be of the compressed gas type. The temperature of the melt can be increased, held constant or decreased by the furnace.

BRIEF DESCRIPTION OF THE DRAWINGS

The invention is more fully exemplified in the accompanying drawings where FIG. 1 shows a channel-type induction furnace provided with inlet and outlet and FIG. 2 a section through the inductor unit of this furnace.

DESCRIPTION OF THE PREFERRED EMBODIMENT

Cast iron (basic iron) is manufactured in a furnace or ladle (not shown) placed in front of the channel-type induction funrace. The iron is transferred to the heat-retaining furnace and simultaneously treated with magnesium alloy. The nodular cast iron thus obtained which is to be stored or kept hot in the channel-type induction furnace, may have the following composition:

|    | Percent by weight |
|----|----|
| C  | Approx. 3.0–4.0 |
| Si | Approx. 1.5–2.0 |
| Mg | 0.04–0.07 |
| Mn | 0.3 | and impurities of P and S. When treated with Ni-Mg the nodular cast iron also contains Ni.

This melt is poured in at the arrow A in FIG. 1 and during tapping the furnace is tipped somewhat so that the nodular cast iron melt is tapped at the arrow B. Above the melt surface in the hearth a closed space 1 is formed since the melt at the inlet and outlet forms fluid locks. The air is evacuated from this space and it is filled with protective gas, either completely or partially, through the gas conduit 2. The over-pressure in the space 1 is maintained between 0.05 and 0.3 atm., preferably 0.1–0.2 atm., so that the surfaces of the inlet and outlet openings are at a suitable level with respect to the quantity of fluid required per time unit.

The melt in the furnace is kept hot by means of one or more inductor units 6 with melt channel(s) 3 and one or more low-frequency coils 4 (FIG. 2). Due to the pinch effect in the melt channel and the influence of melt poured in and tapped off, the nodular cast iron is thoroughly stirred and the formation of enclosed parts of nodular cast iron is avoided, which would otherwise destroy the product when stored too long in the furnace.

The above mentioned treatment with magnesium may also be carried out in the channel-type induction furnace.

When evacuating the furnace, protective gas (inert gas such as nitrogen argon or the like) is blown in so that the air is completely or for the most part driven out and the furnace filled with protective gas. When the melt is subsequently poured in, fluid locks are obtained for this protective gas atmosphere at the inlet and outlet of the furnace. The pressure in the closed space can be controlled by the supply or withdrawal of protective gas through a conduit 2 for this purpose connected to the gas container and pumping member (not shown).

Tapping of the furnace is carried out by tilting it a certain angle in conventional manner but this angle may not be greater than such as allows the fluid-lock to be maintained at the inlet and out. Inoculation of the iron with ferrosilicon or the like is carried out, for example, in connection with the tapping.

The upper part of the hearth is made in the form of a lid 5 which is vacuum-tight or pressure-tight and connectable to the side walls of the hearth. The inductor unit 6 can be made exchangeable in known manner and the number of units may be chosen from one upwards. In certain cases alloy constituents may, by means of suitable sluice members, not shown, be introduced into the hearth in some other way than through the inlet (A). In order to obtain desulphurizing of the melt and in order to maintain as far as possible the magnesium content, calcium carbide is added when the furnace is first filled. which forms slag on the melt surface in the hearth. Said slag can be retained for some time but must of course be exchanged or refilled sometimes and this may be carried out through separate conduits or sluice members or when the furnace is emptied and refilled.

In view of the calcium carbide addition the furnace should be lined with neutral or basic material.

The invention can be varied in many ways within the scope of the following claims.

What is claimed is:

1. Method of manufacturing, storing and heat-retaining nodular cast iron including pouring melt consisting essentially of iron into the inlet of a double-sided closed induction furnace of submerged resistor type with a central hearth and inlet and outlet channels separated from the hearth and with at least one inductor unit communicating with said hearth separately from said inlet and outlet channels, filling said furnace with melt to such a height that a closed space is formed above the melt in the central hearth of the furnace, which space thus is sealed from the atmosphere, evacuating air from said space and introducing protective gas into the space at a pressure above atmospheric together with a component comprising magnesium, thus forming nodular cast iron, storing said nodular cast iron and keeping it hot in said furnace for a considerable time, and tapping off the hot iron through the outlet.

2. Method of manufacturing, storing and heat-retaining nodular cast iron, comprising treating melt consisting essentially of iron with an alloying medium containing magnesium, thus obtaining molten nodular cast iron, pouring said molten nodular cast iron into the inlet of a double-sided closed induction furnace of submerged resistor type with a central hearth and inlet and outlet channels separate from the hearth and with at least one inductor unit communicating with said hearth separately from said inlet and outlet channel, filling said furnace with melt to such a height that a closed space is formed above the melt in the central hearth of the furnace, which space thus is sealed from the atmosphere, evacuating air from said space and introducing protective gas into the space at a pressure above atmospheric, stirring said nodular cast iron and keeping it hot in said furnace for a considerable time, and tapping off the hot iron through the outlet.

References Cited
UNITED STATES PATENTS

| | | | |
|---|---|---|---|
| 1,839,927 | 1/1932 | Neuhauss | 75—12 |
| 2,144,200 | 1/1939 | Rohn et al. | 75—129 |
| 3,295,960 | 1/1967 | Parlee et al. | 75—130 R X |
| 3,421,887 | 1/1969 | Kusaka | 75—130 R |

L. DEWAYNE RUTLEDGE, Primary Examiner

U.S. Cl. X.R.

75—13, 50, 96, 130 B

REEXAMINATION CERTIFICATE (551st)
United States Patent [19]
Andersson

[11] B1 3,764,305
[45] Certificate Issued Aug. 12, 1986

[54] METHOD OF STORAGE AND HEAT-RETAINING FOR TREATED NODULAR CAST IRON

[75] Inventor: Georg Andersson, Västerås, Sweden

[73] Assignee: Allmanna Svenska Elektriska Aktiebolaget, Västerås, Sweden

Reexamination Request:
No. 90/000,706, Jan. 10, 1985

Reexamination Certificate for:
Patent No.: 3,764,305
Issued: Oct. 9, 1973
Appl. No.: 118,957
Filed: Feb. 25, 1971

Related U.S. Application Data

[63] Continuation of Ser. No. 703,175, Feb. 5, 1968, abandoned.

[30] Foreign Application Priority Data

Feb. 10, 1967 [SE] Sweden .................. 1860/67

[51] Int. Cl.⁴ ........................................... C22C 33/08
[52] U.S. Cl. ..................... 75/130 R; 75/12; 75/13; 75/129; 75/130 A
[58] Field of Search ........... 75/12, 129, 130 A, 130 B, 75/50, 46, 96, 13, 130 R

[56] References Cited

U.S. PATENT DOCUMENTS

| | | | |
|---|---|---|---|
| 1,839,927 | 1/1932 | Neuhauss | 75/12 |
| 2,144,200 | 1/1939 | Rohn et al. | 75/129 |
| 2,781,260 | 2/1957 | Grandpierre | 75/130 R |
| 3,191,247 | 6/1965 | Holz | 22/79 |
| 3,221,379 | 12/1965 | Shearman | 22/69 |
| 3,295,960 | 1/1967 | Parlee et al. | 75/130 R |
| 3,421,887 | 1/1969 | Kusaka | 75/130 R |

FOREIGN PATENT DOCUMENTS

| | | |
|---|---|---|
| 11046 | 7/1952 | Fed. Rep. of Germany . |
| 1460971 | 10/1966 | France . |
| 32-10462 | 12/1957 | Japan . |
| 6860/54 | 10/1964 | Japan . |
| 40-7045 | 4/1965 | Japan . |
| 41-9405 | 5/1966 | Japan . |
| 183451 | 4/1963 | Sweden . |
| 194983 | 3/1965 | Sweden . |

*Primary Examiner*—Peter D. Rosenberg

[57] ABSTRACT

Nodular cast iron treated with an alloying medium containing magnesium is poured into an inlet of a double-crossed induction furnace, the inlet and outlet channels of which are sealed by the melt, forming a closed space above the melt from which air is evacuated and into which protective gas is introduced at a pressure above atmospheric. The nodular cast iron is stored and kept hot in the furnace and is tapped off through the outlet. The over-pressure above the melt is preferably maintained at 0.005 to 0.3 atomsphere. Calcium carbide may be added from time to time to form slag.

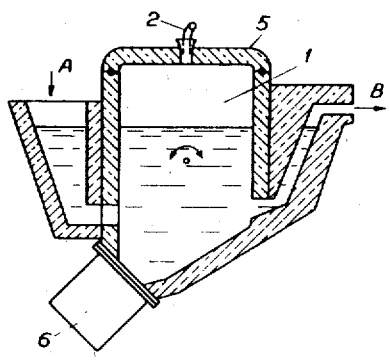

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

1. Method of *continuously or semi-continuously* manufacturing, storing and [heat-] retaining *the heat content of* nodular cast iron including *continuously or semi-continuously* pouring melt consisting essentially of iron into the inlet of a double-sided closed induction furnace of submerged resistor type with a central hearth and inlet and outlet channels separated from the hearth and with at least one inductor unit communicating with said hearth separately from said inlet and outlet channels, filling said furnace with melt to such a height that a closed space is formed above the melt in the central hearth of the furnace *thereby closing off said inlet and outlet channels*, which space thus is sealed from the atmosphere, evacuating air from said space and introducing protective gas into the space at a pressure above atmospheric together with a component comprising magnesium, thus forming nodular cast iron, storing said nodular cast iron and keeping it hot in said furnace for a considerable time, and *continuously or semi-continuously* tapping off the hot iron through the outlet.

2. Method of *continuously or semi-continuously* manufacturing, storing and [heat-] retaining *the heat content of* nodular cast iron, comprising treating melt consisting essentially of iron with an alloying medium containing magnesium, thus obtaining molten nodular cast iron, *continuously or semi-continuously* pouring said molten nodular cast iron into the inlet of a double sided closed induction furnace of submerged resistor type with a central hearth and inlet and outlet channels separate from the hearth and with at least one inductor unit communicating with said hearth separately from said inlet and outlet [channel] *channels*, filling said furnace with melt to such a height that a closed space is formed above the melt in the central hearth of the furnace *thereby closing off said inlet and outlet channels*, which space thus is sealed from the atmosphere, evacuating air from said space and introducing protective gas into the space at a pressure above atmospheric, stirring said nodular cast iron and keeping it hot in said furnace for a considerable time, and *continuously or semi-continuously* tapping off the hot iron through the outlet.

* * * * *